United States Patent
Jorgensen (10) Patent No.: US 12,373,236 B1
(45) Date of Patent: Jul. 29, 2025

(54) PROVIDING STRONG SECURITY BOUNDARIES IN PROCESS VIRTUAL MACHINES

(71) Applicant: Amazon Technologies, Inc., Seattle, WA (US)

(72) Inventor: Andrew James Jorgensen, Lynnwood, WA (US)

(73) Assignee: Amazon Technologies, Inc., Seattle, WA (US)

( * ) Notice: Subject to any disclaimer, the term of this patent is extended or adjusted under 35 U.S.C. 154(b) by 529 days.

(21) Appl. No.: 17/657,318

(22) Filed: Mar. 30, 2022

(51) Int. Cl.
G06F 9/455 (2018.01)

(52) U.S. Cl.
CPC ............ *G06F 9/45558* (2013.01); *G06F 2009/45587* (2013.01)

(58) Field of Classification Search
CPC ............. G06F 9/45558; G06F 2009/45587
USPC ............. 707/694, 754, 756, 769, 781, 783
See application file for complete search history.

(56) References Cited

U.S. PATENT DOCUMENTS

| | | | | |
|---|---|---|---|---|
| 6,237,053 B1 * | 5/2001 | Herrod | ............... | G06F 9/44505 710/72 |
| 6,363,409 B1 * | 3/2002 | Hart | ............... | G06F 9/4843 718/1 |
| 12,141,137 B1 * | 11/2024 | Arora | ............... | G06F 16/2452 |
| 2009/0287968 A1 * | 11/2009 | Lee | ............... | H04L 69/165 709/228 |
| 2011/0138370 A1 * | 6/2011 | Albert | ............... | G06F 9/543 717/136 |
| 2012/0136648 A1 * | 5/2012 | Elliot | ............... | G06F 40/40 704/E11.001 |
| 2014/0068612 A1 * | 3/2014 | Torrey | ............... | G06F 9/45558 718/1 |
| 2018/0018100 A1 * | 1/2018 | Aho | ............... | G06F 3/064 |
| 2018/0034943 A1 * | 2/2018 | Blankenburg | ............... | H04L 69/08 |

OTHER PUBLICATIONS

Daniels, Waratek, application security for Java, A technical overview, Power Point, 2014, Waratek Ltd., 31 pages.
Andersen, Rasmus et al., The Scientific Byte Code Virtual Machine, University of Copenhagen eScience Centre, Dec. 18, 2013, 8 pages.

* cited by examiner

*Primary Examiner* — Phong H Nguyen
(74) *Attorney, Agent, or Firm* — Knobbe, Martens, Olson & Bear, LLP (57) ABSTRACT

Systems and methods are provided for strongly isolating processes executing in a process virtual machine (PVM), to provide a security boundary similar to that provided by a system virtual machine (SVM). The PVM can include a hypervisor that supports execution of multiple processes within the PVM. The hypervisor can intermediate data resource requests from the processes and apply translation rules to such requests, which rules can isolate data resources accessible to each process from data resources available to other processes of the PVM.

21 Claims, 5 Drawing Sheets

PROVIDING STRONG SECURITY BOUNDARIES IN PROCESS VIRTUAL MACHINES

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that operate independently. With virtualization, the single physical computing device can create, maintain, delete, or otherwise manage virtual machines in a dynamic manner. In turn, users can request computer resources from a data center and be provided with varying numbers of virtual machine resources. These virtual machines may carry out a wide variety of functionalities otherwise possible on a non-virtualized hardware device, such as invoking network-accessible services, conducting data processing, and the like.

DETAILED DESCRIPTION

Generally described, aspects of the present disclosure relate to providing for highly efficient virtualization of computing resources by use of a secure process virtual machine (PVM) supporting multiple, isolated processes. More specifically, a secure PVM as disclosed herein may enable multiple processes to independently execute within the PVM, while maintaining a secure isolation boundary between the processes. The PVM as disclosed herein can enable execution of platform-independent intermediate representations of code, such as bytecode, and thereby provide for execution of code independent of the underlying hardware of a host device for the process virtual machine. Moreover, the PVM, in not virtualizing hardware in the manner of a system virtual machine, may provide for more efficient execution of code relative to such a system virtual machine and in lower latency execution of code due, for example, to lack of need within a PVM for code such as an operating system. Due to the benefits of the PVM disclosed herein, including the efficiency of executing multiple processes within a PVM and the security boundary provided between such processes, the PVM disclosed herein may be used to support a wide variety of network functionalities with increased efficiency relative to other techniques. For example, a PVM as disclosed herein may enable more efficient implementation of serverless network services, by replacing relatively inefficient system virtual machines, executing a relatively large amount of code (e.g., an operating system and user-supplied function code) with a more efficient PVM executing a relatively low amount of code (e.g., the user-supplied function code, absent an operating system). Thus, the multi-process PVM disclosed herein can support increase efficiency in a variety of network services and applications.

As noted above, embodiments of the present disclosure relate to a secure, multi-process PVM. As would be recognized by one skilled in the art, a process virtual machine, or "PVM", differs from a system virtual machine (which, in other contexts, is sometimes referred to simply as a "virtual machine"). In particular, the term "system virtual machine" is typically used—and will be used herein—to refer to software providing a full operating system platform, including virtualization of hardware. System virtual machines, or "SVMs", generally provide for emulation of an instruction set architecture (ISA): the hardware to software interface between an operating system and physical computing resources. Thus, system virtual machines enable, for example, multiple operating systems to execute on a single physical host device, with each operating system being blind to the fact that multiple such operating systems are sharing the computing device. In contrast, the term process virtual machines (PVM) is used herein to refer to a virtual machine that does not virtualize hardware. Rather, PVMs emulate an application programming interface (API) or application binary interface (ABI) that operates within an operating system. One example of a PVM is a JAVA™ Virtual Machine (JVM), though others are possible. Because PVMs emulate an API or ABI rather than an ISA, multiple PVMs may share an operating system and the hardware computing resources available to that operating system. For this reason, PVMs are typically more efficient than SVMs, in that emulation of hardware typically consumes computing resources that represent overhead for operation of the SVM. Unless stated to the contrary, the term "virtual machine" of "VM," as used herein, refers to a PVM, and not an SVM.

Process virtual machines also differ from other virtualization technologies, such as container technologies sometimes referred to as "operating-system-level virtualization." Typically, container technologies focus on creating a "sandbox" environment in which processes can execute, but do not themselves create a virtual machine (e.g., a virtualized API or ABI) on which processes execute. For example, a container may be used to contain all code related to a specific functionality, including libraries, utilities, and the like, in order to prevent other code within a given operating system from interfering with that functionality (e.g., due to an incompatibility between the containerized code and other code in the operating system). However, because a container simply creates a partition within an operating system, that container must still be loaded with platform-dependent code in the same manner as other applications executing within the operating system. Thus, containers generally do not provide the benefits of a PVM in, for example, enabling platform-independent code execution via a virtualized API or ABI. Moreover, any processes executing within a container generally share access to the resources of that container, meaning that such processes are not isolated from one another. As a result, containers are distinct from PVMs and do not provide the benefits to use of such PVMs.

One difficulty with existing PVMs is a reduced security boundary relative to SVMs or other virtualization technologies. For example, because SVMs operate at the level of hardware virtualization, strong security guarantees can be made for processes executing within an SVM, such as a guarantee that such the data of such processes is inaccessible to other SVMs on a shared host. These security guarantees have made SVMs the virtualization method of choice for many hosted computing platforms (also known as "cloud computing" platforms). For example, SVMs may be used to implement a serverless computing environment, such as that disclosed in U.S. Pat. No. 9,323,556, entitled "PROGRAMMATIC EVENT DETECTION AND MESSAGE GENERATION FOR REQUESTS TO EXECUTE PROGRAM CODE" and filed Sep. 30, 2014 ("the '556 patent"), the entirety of which is hereby incorporated by reference, enabling end users of the serverless computing environment to request execution of user-specified code and have that code executed on-demand in a low latency manner.

However, the use of SVMs in these contexts has drawbacks. For example, as noted above, SVMs are typically less efficient than PVMs due to increased overhead resource usage. Moreover, SVMs may require a relatively large amount of additional code, such as an operating system, libraries, and the like, relative to an PVM, which may execute on, for example, only user-supplied code implementing specific functionality. This additional code may inhibit low-latency operation, for example requiring a transfer of large amounts of data over a network to a host device prior to execution of desired code. As another example, the use of an SVM can lead to platform-dependence. For example, while it may be possible for an SVM to emulate different hardware than that on an underlying physical host device, such emulation may be particularly inefficient (e.g., create significant overhead in terms of computing resource usage, leading for example to slow execution). Thus, an SVM may be practically limited to emulating hardware identical or similar to (e.g., with a common instruction set or architecture) that of an underlying host device. Accordingly, services utilizing SVMs may expect to execute on a specific type of hardware. This can lead to dependence of the service on that hardware, such that the service cannot, for example, be deployed to a new hardware architecture while maintaining backwards compatibility to the older hardware architecture.

Use of a PVM may avoid these drawbacks. As noted above, a PVM can provide for higher efficiency than a SVM by avoiding a need to emulate physical hardware. Moreover, code to be executed in a PVM may be authored in a platform-independent manner. A PVM can then include a just-in-time (JIT) compiler, interpreter, or the like that executes the code (or other representation of the code, such as a platform-independent intermediary representation) to implement desired functionality. Because the code is platform-independent, no dependency exists with respect to the underlying hardware of a host device. Rather, such code may be deployed to any available hardware, regardless of for example hardware architecture.

One issue that may occur when using a PVM to execute user-specified code (or to implement other functionalities) is a reduced security boundary between processes executing in a PVM. Each such process may share access to an operating system, and as such share, for example, a file system, sockets (including network sockets), and the like. This shared access can lead to potential security concerns, such as the potential for one process (e.g., executing on a first PVM) to access data of another process (e.g., executing on a second PVM). To address this concern, embodiments of the present disclosure provide for a multi-process PVM with enforced data isolation between each process. More specifically, a multi-process PVM as disclosed herein may support execution of multiple processes (e.g., multiple independents sets of bytecode, source code, etc.) The PVM may include a hypervisor level that accepts input/output (I/O) requests from processes executing on the PVM, and resolves such requests in a manner that maintains isolation between isolated processes. For example, the PVM hypervisor may maintain permissions for each process indicating a set of data resources available to the processes. On receiving an I/O request, the PVM hypervisor may verify that the I/O request complies with such permissions. In some embodiments, permissions may specify translations to be applied to I/O requests in order to provide isolation. For example, the hypervisor may have access to multiple communication networks, but may not expose such networks to a process. Rather, for each process, the hypervisor may select an appropriate network, translating generic network requests to the appropriate network for the process. Illustratively, each network may be a software-defined virtual network (e.g., a "virtual cloud") providing resources associated with an account owning a process. Thus, each process may be connected to an appropriate virtual network by the hypervisor. In this way, processes associated with different virtual networks may be isolated from one another. Similarly, where processes executed by a PVM have access to local data resources, such as files or memory space, the PVM may apply translations to I/O requests for such local data resources to ensure that these I/O requests are isolated from one another. For example, requests for files in a generic location (e.g., a root directory such as "/") may be translated to a process-specific directory (e.g., "/process1/") or another directory associated with a process, such as an account-specific directory (e.g., "/account1/"), such that each process, or associated group of processes like those associated with a given account, is provided with a distinct set of files. Similarly, each request for memory I/O may be translated into a process-specific memory space. In this manner, the PVM hypervisor may provide for fully isolated process execution.

As will be appreciated by one of skill in the art in light of the present disclosure, the embodiments disclosed herein improve the ability of computing systems to provide for efficient, secure execution user-specified code. Moreover, the presently disclosed embodiments address technical problems inherent within computing systems; specifically, the difficulty of providing for both efficient execution and isolation among different processes. These technical problems are addressed by the various technical solutions described herein, including a multi-process PVM that includes data resource permissions and I/O request translation to user data resource isolation within a host computing device. Thus, the present disclosure represents an improvement in host devices and computing systems in general.

The foregoing aspects and many of the attendant advantages of this disclosure will become more readily appreciated as the same become better understood by reference to the following description, when taken in conjunction with the accompanying drawings.

Figure 1:
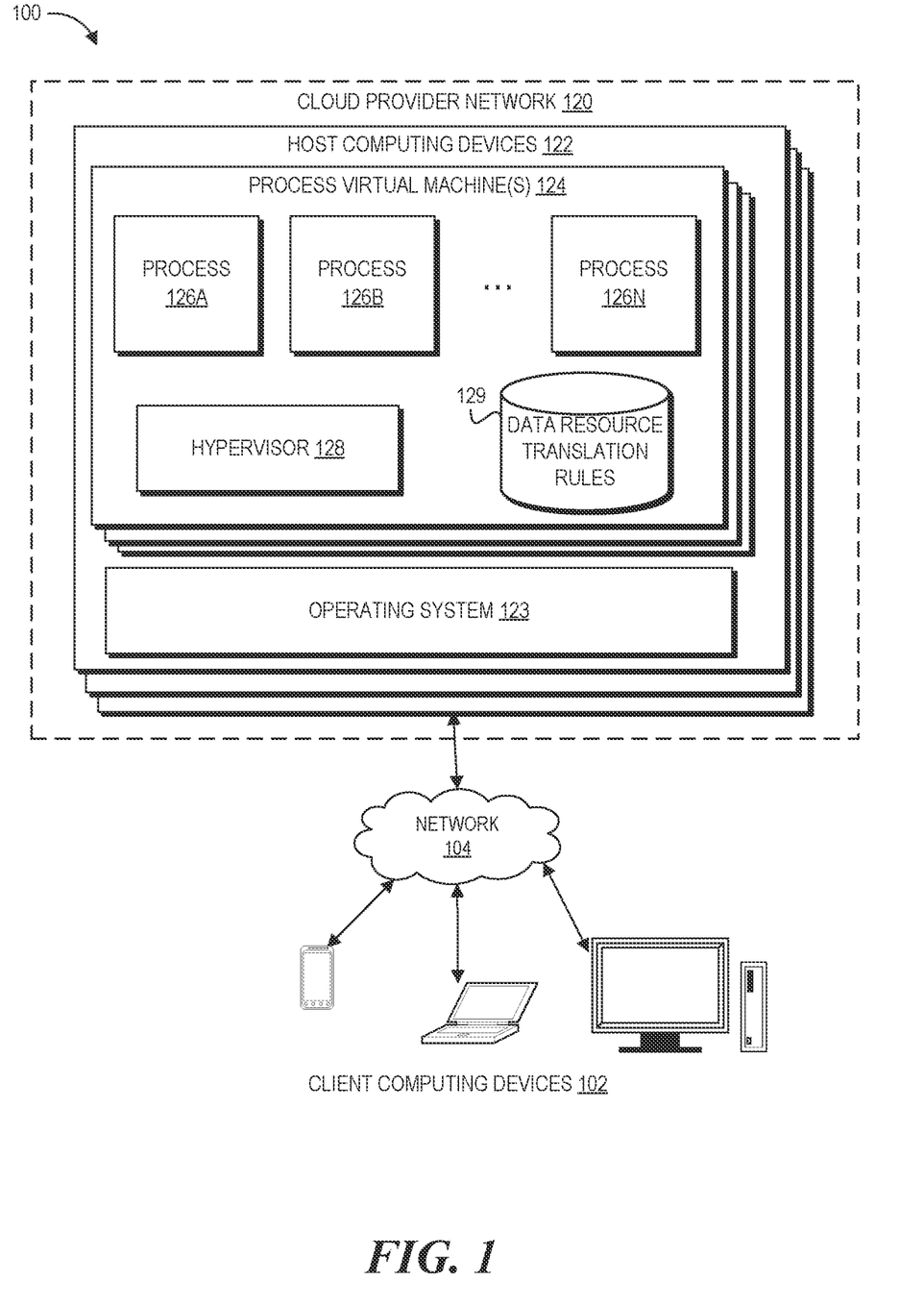
FIG. 1 depicts an example computing environment including a cloud provider network in which embodiments of the present disclosure can be implemented to provide isolated process execution within a process virtual machine.

FIG. 1 depicts an example computing environment 100 including a cloud provider network 120 in which embodiments of the present disclosure can be implemented. The cloud provider network 120 can be accessed by client computing devices 102 over a network 104. A cloud provider network 120 (sometimes referred to simply as a "cloud"), refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network 120 may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

In FIG. 1, the cloud provider network 120 includes sets of host computing devices 122 providing one or more process virtual machines 124 supporting executing of code. The code may be, for example, user-specified code associated with a serverless code execution system. The code may be, for example, source code or an intermediary representation of such source code. Each host computing device 122 includes hardware computer memory and/or processors and a computer-readable medium storing instructions that, when executed by a processor of the server, allow the server to perform its intended functions, such as execution of code to result in processes 126. In one embodiment, the code executed to result in processes 126 is platform-independent, enabling the code to execute regardless of the underlying physical architecture of the host computing devices 122. Accordingly, a physical configuration of the host computing devices 122 may vary. For example, the devices 122 may include computing devices with different processor or memory architectures.

While the cloud provider network 120 is shown in FIG. 1 as including host computing devices 122 providing process virtual machines 124, the network 120 may additionally include other configurations of host computing devices 122. For example, other host computing devices 122 may support other network functionalities provided by the network 120, such other compute services, data storage services, network services, etc. In addition, while process virtual machines 124 are shown in FIG. 1 as implemented directly on a host computing device 122, which in FIG. 1 represents a non-virtualized physical computing device, in some embodiments process virtual machines 124 may be implemented in a system virtual machine that is in turn implemented on a host computing device 122. While not shown in FIG. 1, the cloud provider network 120 may include other computing devices facilitating operation of the host computing devices 122, such as data stores to store account information, computing devices to implement logging, monitoring, and billing services, etc.

The cloud provider network 120 can be formed as a number of regions, where a region is a separate geographical area in which the cloud provider clusters data centers. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g., via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability. The elements shown in FIG. 1 illustratively represent a collection of elements present in a single region or availability zone. These elements may thus be replicated in each such region or availability zone.

The cloud provider network 120 can provide on-demand, scalable computing platforms to users through the network 104, for example allowing users to execute processes 126 within process virtual machines 124. Illustratively, a client computing device 102 may interact with the cloud provider network 120 to submit code executable to result in a process 126 and to submit security information for such code, such as data resources accessible to the code and translation rules specifying how to handle data resource requests from a process 126. Separately or jointly, the client computing device 102 may request execution of the code to result in an executing process 126. As discussed below, a hypervisor 128 within a process virtual machine 124 may facilitate such execution and manage data resource requests from each process 126, such that security is maintained between processes 126 and the processes 126 are appropriately isolated from one another.

As illustrated in FIG. 1, host computing devices 122 can communicate over network 104 with each other and with client computing devices 102. The network 104 can include any appropriate network, including an intranet, the Internet, a cellular network, a local area network or any other such network or combination thereof. In FIG. 1, the network 104 is illustratively a general-purpose communication network, such as the Internet. Accordingly, the network 104 may contain packetized information enabling arbitrary data exchange between networked devices. Protocols and components for communicating via the Internet or any of the other aforementioned types of communication networks are known to those skilled in the art of computer communications and thus, need not be described in more detail herein.

Client computing devices 102 can include any network-equipped computing device, for example desktop computers, laptops, smartphones, tablets, e-readers, gaming consoles, and the like. Clients can access the cloud provider network 120 via the network 104 to view or manage their data and computing resources, as well as to use websites and/or applications hosted by the cloud provider network 120. While shown as distinct in FIG. 1, elements of the cloud provider network 120 may also act as clients to other elements of that network 120. Thus, a client device 102 can generally refer to any device accessing a network-accessible service as a client of that service.

As noted above, users, using client computing devices 102, may desire to execute code on the cloud provider network 120 to implement functionality associated with such code. Moreover, users may desire that such code execute securely. For example, the code may access or generate sensitive or confidential information, and as such users may require that the cloud provider network 120 ensure that such data is not accessible to unauthorized parties. One mechanism for providing such security might be to provide end users with system virtual machines executed by host computing devices 122. Because such system virtual machines provide for virtualized hardware, an independent operating system, and the like, there may be a strong security boundary between such system virtual machines. Accordingly, the cloud provider network 120 may enable users to generate and access such system virtual machines, execute code in such system virtual machines, and the like. However, use of system virtual machines may present various drawbacks. For example, use of such system virtual machines may impose significant overhead in terms of computing resource usage. Further, use of such system virtual machines may create platform dependence, such that code to be executed is required to be compatible with an operating system of the system virtual machine, and often such that the system virtual machine provides hardware that is similar to or the same as an underlying host. These drawbacks may be exacerbated in particular use cases. For example, creation of a system virtual machine may require significantly more time than a process virtual machine. This may make use of system virtual machines problematic in low-latency operations, such as servicing serverless code execution requests.

To address these problems, host computing devices 122 as shown in FIG. 1 may be configured to provide process virtual machines 124 that enable strong isolation between processes 126 executing on such process virtual machines 124, which processes 126 are shown in FIG. 1 as processes 126A-N. Specifically, the process virtual machines 124 of FIG. 1 may each include a hypervisor 128 configured to translate data resource requests of each process 126 according to data resource translation rules 129, which ensure appropriate isolation between data resources of the host computing device 122 accessible to each process 126. As used herein, a data resource includes any logical resource of a host computing device 122 providing for reading or writing of data. Data resources may be contrasted, for example, with computing resources of the host computing device 122, which computing resources represent physical resources such as processing time, memory, bandwidth, and the like. Illustrative examples of data resources include, but are not limited to, files stored in a file system of the host computing device 122, data sockets (including, e.g., both internal communication sockets and network sockets, such as sockets enabling communication on the network 104), and memory locations (e.g., within random access memory of a host computing device 122, including for example memory-mapped files). Data resources further include interfaces, such as those facilitating inter-process communication on an operating system or remote procedure calls. Examples of such interfaces message queues, pipes, message channels, and the like. Still further, data resources include concurrency controls, such as mutexes and semaphores, enabling control of concurrent access to shared data resources. Data resource translation rules 129 may be used to translate such data resource requests on a per-process 126 basis, in order to control access to data by the process 126. For example, the data resource translation rules 129 may specify that each process 126 is to be provided with a particular subset of memory space of the process virtual machine 124, which subset is not shared among processes 126. As another example, the data resource translation rules 129 may specify that each process 126 is to be provided with a particular subset of a filesystem host computing device 122, which subset is not shared among processes 126. As yet another example, the data resource translation rules 129 may specify that each process 126 is to be provided distinct network sockets not shared among processes 126. In some cases, the data resource translation rules 129 may further specify During execution, a process 126 may request access to a data resource. When executed outside a process virtual machine 124 as disclosed herein, such a request may be routed to the operating system 123, which may return information (e.g., a file descriptor) enabling the process to access the data resource. However, in FIG. 1, such a request may be intercepted by the hypervisor 128 and translated according to data resource translation rules 129 corresponding to a requesting process 126. Illustratively, to isolate file system data read by or written to each process 126, each file request by a process 126 may be translated into a subdirectory associated with that process 126. Illustratively, file requests from process 126A may be routed to a subdirectory "/processA/", such that a request to read the file "/foo" is translated into a request to read the file "/processA/foo". Similarly, file requests from process 126B may be routed to a subdirectory "/processB/", such that a request to read the file "/bar" is translated into a request to read the file "/processB/bar". In this way, file data read or written to by a process 126 may be isolated from other processes 126. With respect to memory requests, the hypervisor may maintain a portion of memory (e.g., RAM) of the host computing device 122 associated with each process 126, and translate such requests accordingly. For example, each process 126 may be associated with a memory offset and range, such that the offset is added to memory locations referenced by a data resource request of a process 126 to ensure that the process 126 reads only locations associated with the process 126, with requests outside the range being denied by the hypervisor 128. Where the data resource request is a socket (including, e.g., network sockets associated with communications on the network 104), the hypervisor 128 may determine an appropriate socket of the operating system 123 to request. Illustratively, the host computing device 122 may be configured with access to multiple networks, such as virtual networks implemented on top of the network 104. Translation rules 129 may thus define that requests from a particular process 126 are to be routed to a particular virtual network, such that requests for a generic network socket are translated into requests for a socket on the particular virtual network. In some instances, rules 129 may also specify permissions, such as by indicating that particular data resource requests should be denied. Accordingly, the hypervisor 128 may act as an intermediary, guaranteeing that processes 126 access only allowable data resources. Moreover, by acting as an intermediary 128, configuration of the process 126 is simplified. That is, a process 126 need not be configured (or even be aware) of the particular locations of data resources it uses. Instead, the process 126 may simply operate on generic data resource locations (e.g., a generic root file system, a generic network, generic memory space, etc.), which the hypervisor 128 may translate into an appropriate request while maintaining isolation among processes 126.

After translation, the hypervisor 128 may pass the translated data resource request to the operating system 123, which can handle the request according to its configuration, such as by returning a file descriptor to a requested file, allocating a requested socket, allocating requested memory, or the like. The hypervisor 128 can then obtain a response from the operating system 123 and pass the response to the process 126. Accordingly, the process 126 can access the requested data resource in a secure and efficient manner.

Figure 2A:
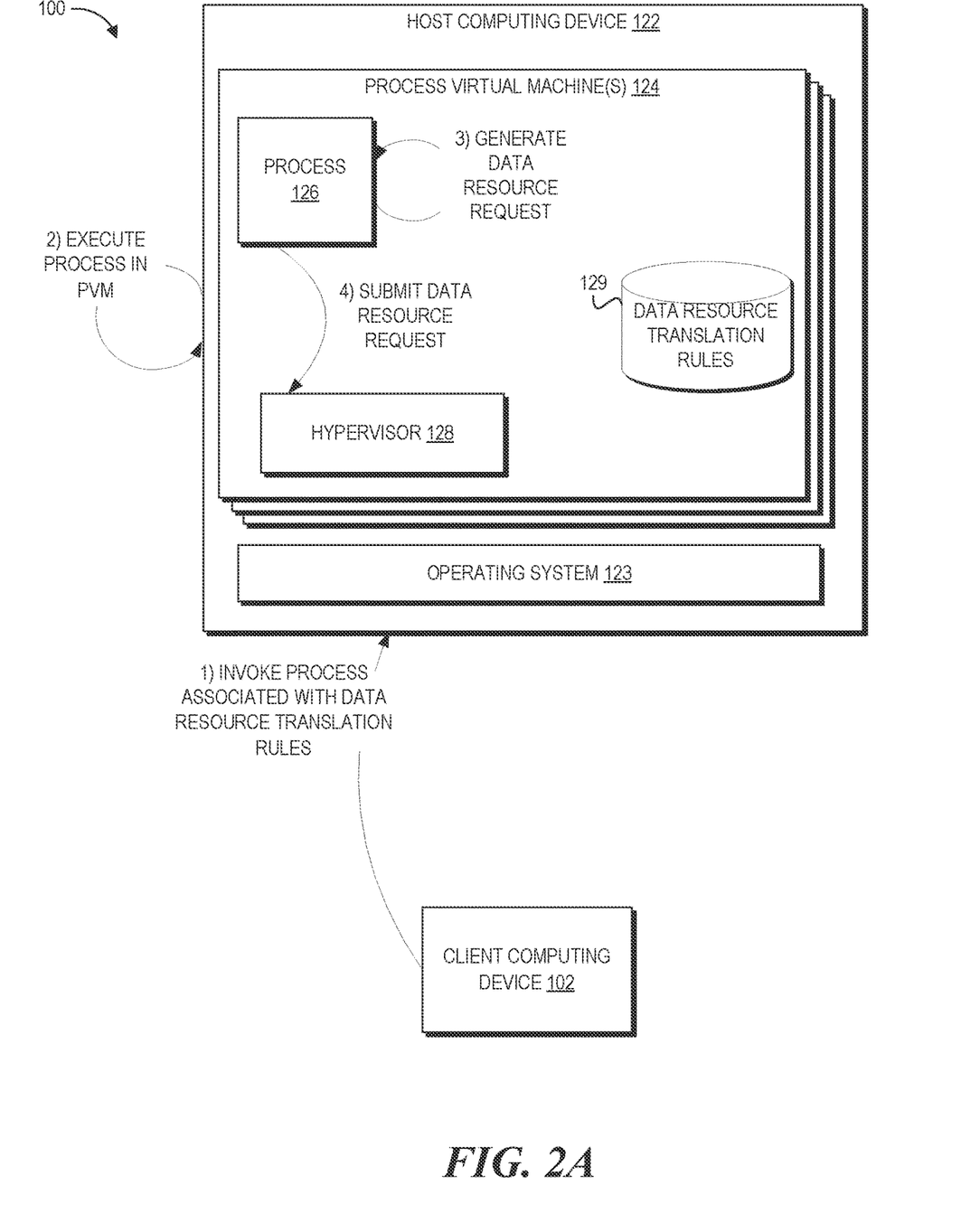
FIGS. 2A and 2B depict example interactions for providing isolated process execution within a process virtual machine, including translation of data resource requests from processes executing within the process virtual machine.
Figure 2B:
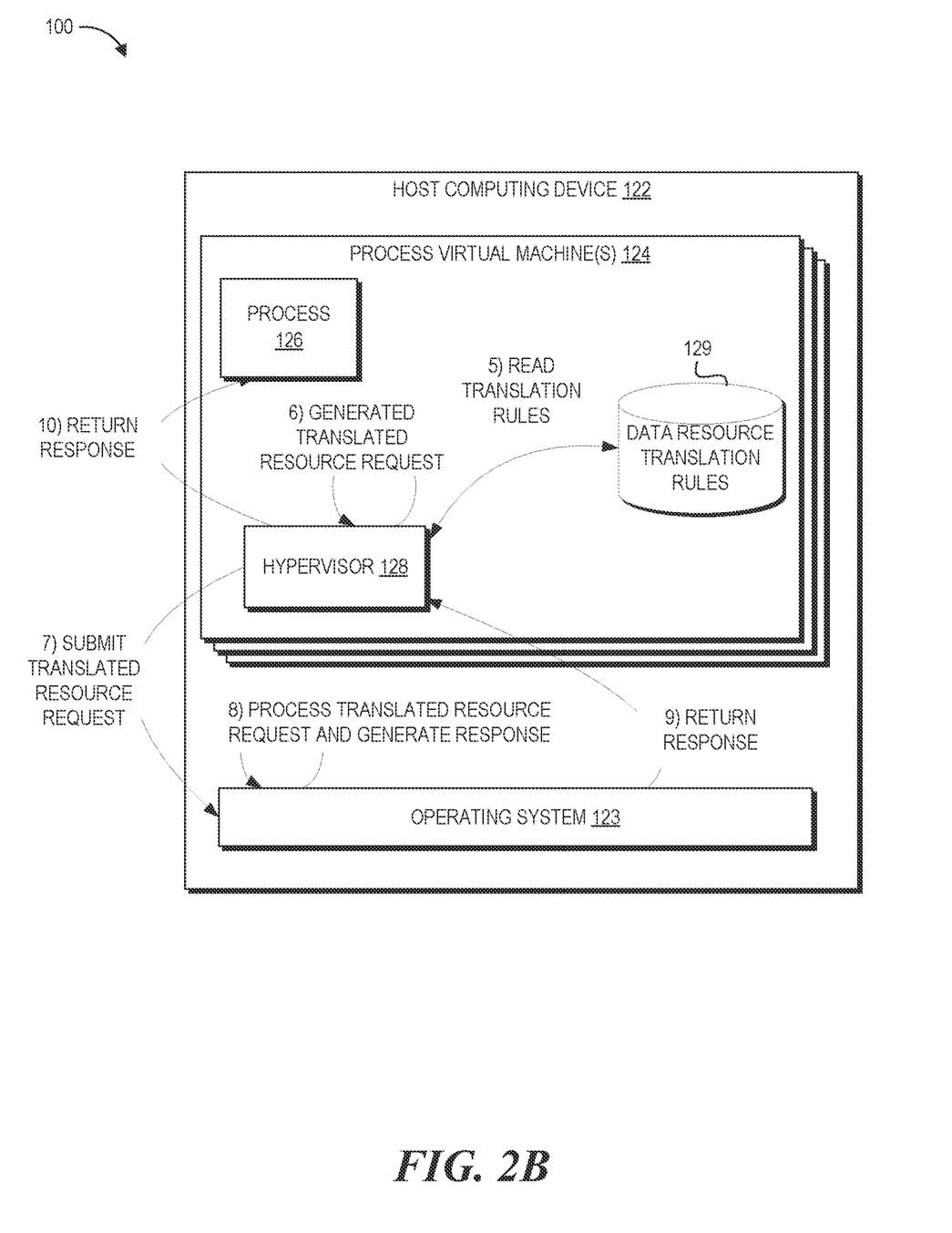

With reference to FIGS. 2A-2B, illustrative interactions will be described for handling data resource requests by a process 126 at a hypervisor 128 of a process virtual machine 124, in accordance with embodiments of the present disclosure.

The interactions begin at (1) of FIG. 2A, where a client computing device 102 invokes the process 126, which is associated with data resource translation rules. Such invocations may occur in a variety of manners. For example, the cloud provider network 120 may include an interface (e.g., a command line interface, graphical user interface, application programming interface, etc.) enabling an end user to invoke a process. In one embodiment, the process 126 is executed in accordance with operation of a serverless computing system, such as that disclosed in the '556 patent, incorporated by reference above. For example, the client computing device 102 may be a frontend or management device of such a serverless computing system, and the invocation may occur in response to operation of that serverless system (e.g., in response to a user request to invoke code on the serverless system). In some embodiments, the process corresponds to execution of code authored or provided by a user. In other embodiments, the process corresponds to execution of other code, such as code provided by the cloud provider network 120. In some embodiments, an end user associated with the process 126 may establish in whole or part data resource translation rules 129 for the process 126, such as by specifying particular files, network resources, or the like that are accessible to the process 126. In other embodiments, the cloud provider network 120 may establish the data resource translation rules 129 in whole or part.

Accordingly, at (2), the host computing device executes the process 126 within the PVM 124. Illustratively, the host computing device 122 may obtain code corresponding to the process 126 (e.g., source code, an intermediary representation, etc.) and execute that code to result in the process 126.

During execution, the process 126 generates a data resource request at (3). As noted above, a data resource request may be any request for a data resource, representing a logical representation of data. The data resource request may correspond to a particular type of data resource, such as a file, a socket, or memory. In some embodiments, the data resource request may include an identifier of a particular data resource and/or a location of the data resource, such as a file location, memory location, network address, etc.

The process 126 may then submit the data resource request to the hypervisor 128 at (4). In some embodiments, the process 126 may not be aware that the request is routed to the hypervisor 128. For example, the process 126 may intend to submit the request to the operating system 123, such as by using a system call of the operating system 123, and the hypervisor 128 may identify and intercept the data resource request.

The interactions of FIG. 2A are then continued in FIG. 2B, where the hypervisor 128 reads translation rules for the request from the data resource translation rules 129, at (5). As noted above, the translation rules may generally specify criteria for translating the data resource request, such as criteria for modifying a location of a requested data resource to ensure that the location is not shared with other processes 126 (e.g., with any other process 126 or with a subset of other processes 126, such as processes 126 of other accounts or otherwise unauthorized processes 126). After reading the translation rules for the process, the hypervisor 128, at (6), generates a translated resource request. As discussed above, the translated resource request may modify the data resource request such that the data resource provided in response to the request is appropriately isolated from data resources available to other processes 126. For example, to isolate file system data read by or written to each process 126, the hypervisor 128 may translate file request by the process 126 into a subdirectory associated with that process 126. 59A After translating the request, the hypervisor submits the translated resource request to the operating system 123, at (7). The operating system 123 then at (8) processes the request as appropriate (e.g., as it would other data resource requests from other applications). One skilled in the art will appreciate that the operating system 123 may apply various functionalities when processing the request, such as verifying that the request complies with permissions of the operating system 123, etc. At (9), the operating system 123 returns a response to the request. For example, the operating system 123 may return a file descriptor associated with the request or other information enabling the process 126 to access the requested data resource. The hypervisor 128 obtains the response, and at (10), passes the response to the process 126 as a request to the data resource request. The process 126 may then utilize the response to access the requested data resource. Accordingly, the process 126 is granted access, as appropriate, to data resources, and may access such resources in accordance with data resource translation rules. Because these rules may be configured to provide for isolation between processes 126, the process virtual machine 124 can enable secure, isolated execution of code within various processes 126 in a manner similar to the isolation provided by system virtual machines, but without the overhead and inefficiency associated with use of such system virtual machines.

Figure 3:
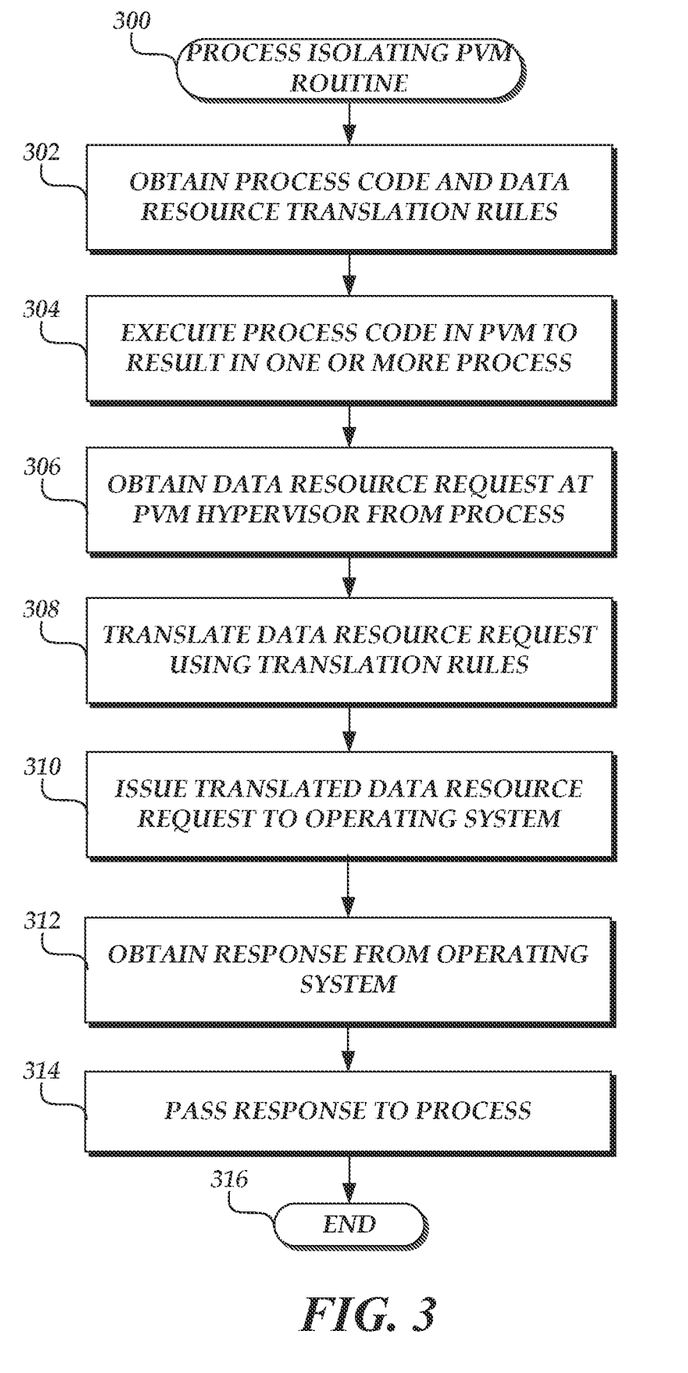
FIG. 3 depicts an illustrative routine for providing isolated process execution within a process virtual machine.

With reference to FIG. 3, an illustrative routine 300 will be described for providing for providing a process isolating PVM will be described. The routine 300 may be implemented, for example, by the process virtual machine 124 of FIG. 1.

The routine 300 begins at block 302, where the PVM 124 obtains code corresponding to a process and data resource translation rules for the process. The code may illustratively be source code or other platform-independent code, such as an intermediary representation of the source code, which can be executed as the process. As noted above, the data resource translation rules may control how data resource requests from the process are handled. For example, the data resource translation rules may specify a translation of data resource requests to isolate each process from each other process on the PVM 124. As discussed above, the data resource translation rules may be user-specified, specified by an operator of a host computing device for the PVM 124, or a combination thereof.

At block 304, the PVM 124 executes the code to result in one or more processes. Execution of the code may include, for example, interpreting the code using an interpreter of the PVM 124 or applying JIT compilation to the code. Thereafter, as discussed below, the PVM 124 can act as an intermediary for I/O operations for the processes, ensuring that processes access only appropriate data resources.

Specifically, at block 306, the PVM 124 obtains, at a hypervisor, a data resource request from an executing process. The data resource request may request access to any logical data resource, such as a file, socket, device, or memory location. For example, a process may invoke a function to open a network socket in order to communicate on a network or invoke a function to read or write to a file, socket, or device (physical or virtualized) of a host computing device hosting the PVM 124.

At block 308, the PVM 124 translates the data resource request according to the translation rules for the process. For example, where the data resource request requests access to a file on a file system, the translation may translate a location of the file to an isolated file system location, such as a location specific to the requesting process. Illustratively, the translation may apply a prefix to the requested file system location, the prefix identifying a portion of the file system particular to a requesting process. Where the data resource request is a request to access a generic memory location, the PVM 124 may translate the request into a request to access a memory location associated with the process 126, such as by adding a process- (or account-) specific offset to the memory location. Where the data resource request is a request to access a generic network, the PVM 124 may translate the request into a request to access a specific network, such as a particular virtual network accessible to the PVM 124 and associated with the requesting process. Accordingly, the PVM 124 may act as an intermediary, guaranteeing that the process accesses only allowable data resources and, in some cases, completely isolating data resources accessible to each process.

At block 310, the PVM 124 makes a request to an operating system of the host computing device for the translated data resource. As discussed above, the operating system may handle the request as it would a request from another application, such as by providing a file descriptor to the PVM 124 enabling access to the translated data resource. The PVM 124 thus obtains the response at block 312 from the operating system, and at block 314, passes the response to the process as a response to the data resource request. The process may then utilize the response to access the translated data resource. Moreover, because the translated data resource is determined based on PVM-enforced rules, the PVM can provide for isolation among data resources of different processes. The routine 300 can then end at block 316.

Accordingly, the routine 300, when executed by a PVM 124 on a host computing device, enables a process executing on the PVM 124 to access data resources in a secure an isolated manner, providing security guarantees similar to those of a system virtual machine while significantly reducing the overhead required to execute processes.

Figure 4:
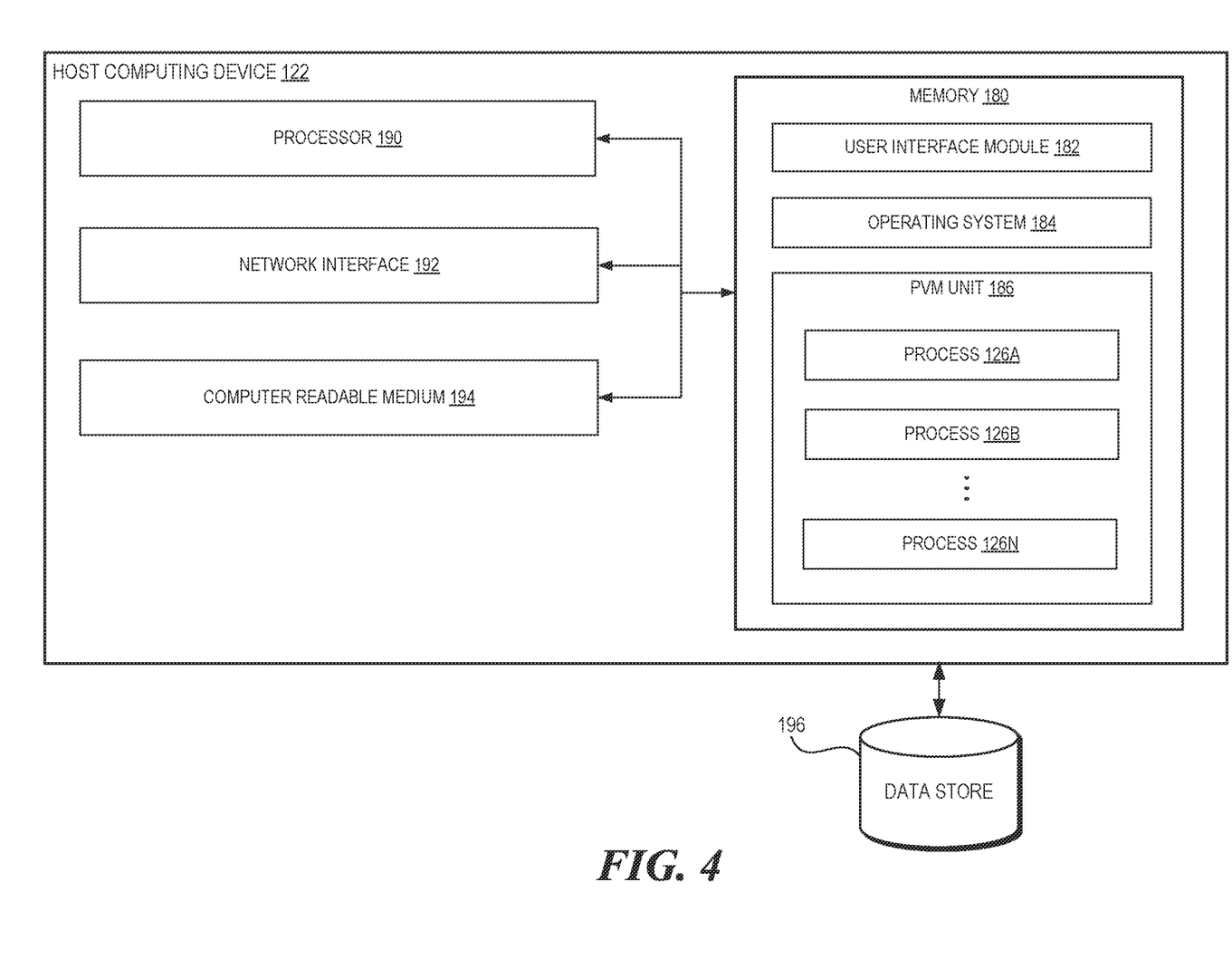
FIG. 4 depicts a general architecture of a computing device or system providing isolated process execution within a process virtual machine in accordance with aspects of the present disclosure.

FIG. 4 depicts an example architecture of a computing system (referred to as the host computing device 12) that can be used to perform one or more of the techniques described herein or illustrated in FIGS. 1-3. The general architecture of the host computing device 122 depicted in FIG. 4 includes an arrangement of computer hardware and software modules that may be used to implement one or more aspects of the present disclosure. The host computing device 122 may include many more (or fewer) elements than those shown in FIG. 4. It is not necessary, however, that all of these elements be shown in order to provide an enabling disclosure. As illustrated, the host computing device 122 includes a processor 190, a network interface 192, and a computer readable medium 194, all of which may communicate with one another by way of a communication bus. The network interface 192 may provide connectivity to one or more networks or computing systems. The processor 190 may thus receive information and instructions from other computing systems or services via the network 104 illustrated in FIG. 1.

The processor 190 may also communicate with memory 180. The memory 180 may contain computer program instructions (grouped as modules or units in some embodiments) that the processor 190 executes in order to implement one or more aspects of the present disclosure. The memory 180 may include random access memory (RAM), read only memory (ROM), and/or other persistent, auxiliary, or non-transitory computer-readable media. The memory 180 may store an operating system 184 that provides computer program instructions for use by the processor 190 in the general administration and operation of the host device 122. The memory 180 may further include computer program instructions and other information for implementing one or more aspects of the present disclosure. For example, in one embodiment, the memory 180 includes a user interface module 182 that generates user interfaces (and/or instructions therefor) for display upon a user computing device, e.g., via a navigation and/or browsing interface such as a browser or application installed on the user computing device. In addition to and/or in combination with the user interface module 182, the memory 180 may include a process virtual machine (PVM) unit 186 representing code executable to host execution of processes 126A-N. As discussed herein, the PVM unit 186, when executed, may intermediate data resource requests from processes 126A-N to enforce security boundaries between such processes. In one embodiment, intermediating data resource requests may include applying data resource translation rules to such requests, which may be stored, e.g., in a data store 196, which may represent any persistent or substantially persistent data store.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A computer-implemented method for providing data-resource isolated processes on a host computing device, the computer-implemented method comprising:

implementing a process virtual machine (PVM) on the host computing device, wherein the PVM is a distinct process from an operating system of the host computing device;

executing a plurality of distinct processes within the PVM; and at the PVM, intermediating data resource requests from the plurality of distinct processes, wherein intermediating data resource requests from the plurality of distinct processes comprises, for each data resource request from a process within the plurality of distinct processes:

obtaining the data resource request from a PVM process of the plurality of distinct processes, wherein the data resource request requests access to a data resource of the host computing device at a first data resource location specified within the data resource request, the data resource corresponding to at least one of a memory space, a file, a device, or a socket;

determining, using the PVM, a translation for first the data resource location specified within the data resource request into a PVM-translated data resource location based on the PVM process within the plurality of distinct processes, the PVM-translated data resource location identifying a second data resource location different from the first data resource location, the second data resource location in a process-specific subset of address space of the operating system of the host computing device for the process, wherein PVM is configured to isolate the translated data resource location from other processes within the plurality of distinct processes;

making a request using the PVM to the operating system of the host computing device for the data resource at the PVM-translated data resource location;

obtaining a response to the request for the data resource from the operating system; and passing the response from the operating system to the process as a response to the data resource request.

2. The computer-implemented method of claim 1, wherein at least one process of the plurality of distinct processes is executed in response to invocation of a serverless function corresponding to the at least one process.

3. The computer-implemented method of claim 1, wherein the data resource corresponds to the file, wherein the data resource identifies the file by a file system location, and wherein the translation for the first data resource location corresponds to a translated file system location.

4. The computer-implemented method of claim 3, wherein the translated file system location appends a prefix, associated with the process making the data resource request, to the file system location.

5. The computer-implemented method of claim 4, wherein determining the translation for the first data resource location comprises applying data resource translation rules specific to the process or associated with an account under which the process is invoked to the data resource request.

6. A host computing device comprising:
a data store storing computer-executable instructions; and
a processor configured to execute the computer-executable instructions, wherein execution of the computer-executable instructions causes the host computing device to:

implement a process virtual machine (PVM) on the host computing device, wherein the PVM is a distinct process from an operating system of the host computing device;

execute a plurality of distinct processes within the PVM; and within the PVM:
obtain a data resource request from a PVM process of the plurality of distinct processes, wherein the data resource request requests access to a data resource of the host computing device at a first data resource location specified within the data resource request;

determine, using the PVM, a translation for the first data resource location specified within the data resource request into a PVM-translated data resource location based on the PVM process within the plurality of distinct processes, the PVM-translated data resource location identifying a second data resource location different from the first data resource location, the second data resource location in a process-specific subset of address space of the operating system of the host computing device for the process;

make a request using the PVM to the operating system of the host computing device for the data resource at the PVM-translated data resource location;

obtain a response to the request for the data resource from the operating system; and pass the response from the operating system to the process as a response to the data resource request.

7. The host computing device of claim 6, wherein the data resource corresponds to at least one of a file, a memory address space, a memory-mapped file, an internal communication socket, a network socket, a message queue, a message channel, a pipe, a mutex, or a semaphore.

8. The host computing device of claim 6, wherein the data resource corresponds to a network socket on a first network, and wherein execution of the computer-executable instructions further causes the host computing device, within the PVM, to determine, using the PVM, the translation for the first data resource location at least partly by mapping the first network to one of a plurality of networks of the host computing device.

9. The host computing device of claim 6, wherein the data resource corresponds to a file on a file system corresponding to a file system location, and wherein the translation for the first data resource location corresponds to a translated file system location.

10. The host computing device of claim 6, wherein the data resource location corresponds to a memory address, and wherein the translation for the first data resource location corresponds to a translated memory address generated by applying an offset to the memory address.

11. The host computing device of claim 6, wherein execution of the computer-executable instructions causes the host computing device to determine the translation for the first data resource location based on data resource translation rules specific to the process.

12. The host computing device of claim 6, wherein execution of the computer-executable instructions causes the host computing device to determine the translation for the first data resource location based on data resource translation rules associated with an account corresponding to the process.

13. The host computing device of claim 6, wherein execution of the computer-executable instructions further causes the host computing device to:
- obtain a second data resource request from the process;
- determine, based at least in part on data resource translation rules that, the second data resource request is to be denied; and
- transmit to the process a denial of the second data resource request.

14. The host computing device of claim 6, wherein the PVM is implemented within a system virtual machine.

15. One or more non-transitory computer-readable media comprising computer-executable instructions that, when executed at a host computing device, cause the host computing device to implement a process virtual machine (PVM), wherein the PVM is a distinct process from an operating system of the host computing device, supporting execution of a plurality of distinct processes within the PVM, wherein the instructions further cause the host computing device, within the PVM, to:
- obtain a data resource request from a PVM process of the plurality of distinct processes, wherein the data resource request requests access to a data resource of the host computing device at a first data resource location specified within the data resource request;
- determine, using the PVM, a translation for the first data resource location specified within the data resource request into a PVM-translated data resource location based on the PVM process within the plurality of distinct processes, the PVM-translated data resource location identifying a second data resource location different from the first data resource location, the second data resource location in a process-specific subset of address space of the operating system of the host computing device for the process;
- make a request using the PVM to the operating system of the host computing device for the data resource at the PVM-translated data resource location;
- obtain a response to the request for the data resource from the operating system; and
- pass the response from the operating system to the process as a response to the data resource request.

16. The one or more non-transitory computer-readable media of claim 15, wherein the data resource corresponds to a network socket on a first network, and wherein execution of the computer-executable instructions further causes the host computing device, within the PVM, to determine the translation for the first data resource location at least partly by mapping the first network to one of a plurality of networks of the host computing device.

17. The one or more non-transitory computer-readable media of claim 15, wherein the data resource corresponds to a file on a file system corresponding to a file system location, and wherein the translation for the first data resource location corresponds to a translated file system location.

18. The one or more non-transitory computer-readable media of claim 15, wherein execution of the computer-executable instructions causes the host computing device to determine the translation for the first data resource location based on data resource translation rules specific to the process.

19. The one or more non-transitory computer-readable media of claim 15, wherein execution of the computer-executable instructions causes the host computing device to determine the translation for the first data resource location based on data resource translation rules associated with an account corresponding to the process.

20. The one or more non-transitory computer-readable media of claim 15, wherein execution of the computer-executable instructions further causes the host computing device to:
- obtain a second data resource request from the process;
- determine, based at least in part on data resource translation rules that, the second data resource request is to be denied; and
- transmit to the process a denial of the second data resource request.

21. The one or more non-transitory computer-readable media of claim 15, wherein the PVM is implemented within a system virtual machine.

* * * * *